(12) United States Patent
Kim et al.

(10) Patent No.: US 10,930,921 B2
(45) Date of Patent: Feb. 23, 2021

(54) NEGATIVE ACTIVE MATERIAL HAVING A SILICON ALLOY CORE AND A SHELL INCLUDING A METAL OXIDE, NEGATIVE ELECTRODE AND LITHIUM SECONDARY BATTERY INCLUDING THE SAME, AND METHOD OF PREPARING THE NEGATIVE ACTIVE MATERIAL

(71) Applicant: SAMSUNG SDI CO., LTD., Yongin-si (KR)

(72) Inventors: Jaehyuk Kim, Yongin-si (KR); Soonsung Seo, Yongin-si (KR); Hana Yoo, Yongin-si (KR); Heeyoung Chu, Yongin-si (KR); Deokhyun Kim, Yongin-si (KR); Yungu Cho, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 153 days.

(21) Appl. No.: 15/696,779

(22) Filed: Sep. 6, 2017

(65) Prior Publication Data
US 2018/0069231 A1 Mar. 8, 2018

(30) Foreign Application Priority Data
Sep. 7, 2016 (KR) .................. 10-2016-0115086

(51) Int. Cl.
*H01M 4/134* (2010.01)
*H01M 10/052* (2010.01)
(Continued)

(52) U.S. Cl.
CPC ........... *H01M 4/134* (2013.01); *H01M 4/043* (2013.01); *H01M 4/131* (2013.01);
(Continued)

(58) Field of Classification Search
CPC .. H01M 4/134; H01M 10/052; H01M 4/0433; H01M 4/386; H01M 4/131;
(Continued)

(56) References Cited

U.S. PATENT DOCUMENTS 9,034,519 B2   5/2015 Xiao et al.
9,577,252 B2   2/2017 Park et al.
(Continued)

FOREIGN PATENT DOCUMENTS

CN    102122708    *  7/2011  .......... H01M 10/052
JP    2008-16446 A    1/2008
(Continued)

OTHER PUBLICATIONS

Machine translation of CN 102122708, Zhong et al., 2011 (Year: 2011).*
Korean Office action dated Sep. 9, 2020.

*Primary Examiner* — Maria Laios
*Assistant Examiner* — Kwang Ho
(74) *Attorney, Agent, or Firm* — Lee IP Law, P.C.

(57) ABSTRACT

Provided are a negative active material, an anode and a lithium secondary battery including the same, and a method of preparing the negative active material. The negative active material includes a silicon alloy core including silicon, iron, and manganese, and a shell including a metal oxide on the silicon alloy core, the metal oxide including one or more of titanium, zirconium, aluminum, cobalt, or lithium. An amount of the metal oxide may be from greater than 0 wt % to less than about 12 wt % based on a total weight of the negative active material.

13 Claims, 8 Drawing Sheets

(51) Int. Cl.
*H01M 4/04* (2006.01)
*H01M 4/131* (2010.01)
*H01M 4/1395* (2010.01)
*H01M 4/36* (2006.01)
*H01M 4/38* (2006.01)
*H01M 4/48* (2010.01)
*H01M 4/485* (2010.01)
*H01M 4/52* (2010.01)
*H01M 10/0525* (2010.01)

(52) U.S. Cl.
CPC ......... *H01M 4/1395* (2013.01); *H01M 4/366* (2013.01); *H01M 4/386* (2013.01); *H01M 4/483* (2013.01); *H01M 4/485* (2013.01); *H01M 4/52* (2013.01); *H01M 10/052* (2013.01); *H01M 10/0525* (2013.01)

(58) Field of Classification Search
CPC .. H01M 4/043; H01M 4/366; H01M 10/0525; H01M 4/483; H01M 4/485; H01M 4/52; H01M 4/1395; H01M 4/523
See application file for complete search history.

(56) References Cited

U.S. PATENT DOCUMENTS

| | | | |
|---|---|---|---|
| 2011/0084229 A1 | 4/2011 | Kawakami et al. | |
| 2014/0332716 A1* | 11/2014 | Hong | H01M 4/386 |
| | | | 252/182.1 |
| 2015/0162604 A1 | 6/2015 | Park et al. | |
| 2015/0380722 A1* | 12/2015 | Blangero | H01M 4/525 |
| | | | 429/231.3 |

FOREIGN PATENT DOCUMENTS

| | | |
|---|---|---|
| KR | 10-2013-0088483 A | 8/2013 |
| KR | 10-2015-0057483 A | 5/2015 |
| KR | 10-2015-0067621 | 6/2015 |
| KR | 10-2015-0077053 A | 7/2015 |
| KR | 10-2016-0069325 A | 6/2016 |

* cited by examiner

NEGATIVE ACTIVE MATERIAL HAVING A SILICON ALLOY CORE AND A SHELL INCLUDING A METAL OXIDE, NEGATIVE ELECTRODE AND LITHIUM SECONDARY BATTERY INCLUDING THE SAME, AND METHOD OF PREPARING THE NEGATIVE ACTIVE MATERIAL

CROSS-REFERENCE TO RELATED APPLICATION

Korean Patent Application No. 10-2016-0115086, filed on Sep. 7, 2016, in the Korean Intellectual Property Office, and entitled: "Negative Active Material, Negative Electrode and Lithium Secondary Battery Including the Same, and Method of Preparing the Negative Active Material," is incorporated by reference herein in its entirety.

BACKGROUND

1. Field

Embodiments relate to a negative active material, a negative electrode and a lithium secondary battery including the same, and a method of preparing the negative active material.

2. Description of the Related Art

Lithium secondary batteries, in particular, lithium-ion batteries are widely used in portable electronic devices, hybrid vehicles (HVs), plug-in hybrid vehicles (PHVs), electric vehicles (EVs), smart grid technology, and the like.

SUMMARY

Embodiments are directed to a negative active material, including a silicon alloy core including silicon, iron, and manganese, and a shell including a metal oxide on the silicon alloy core, the metal oxide including one or more of titanium, zirconium, aluminum, cobalt, or lithium. An amount of the metal oxide may be from greater than 0 wt % to less than about 12 wt % based on a total weight of the negative active material.

The amount of the metal oxide may be from greater than 0 wt % to about 6 wt % based on the total weight of the negative active material.

The metal oxide may include at least one of $TiO_2$, $ZrO_2$, $Al_2O_3$, $Co_3O_4$, $Li_2ZrO_3$, or $LiTi_2O_4$.

The metal oxide may be $TiO_2$.

The metal oxide may have a median particle diameter D50 of about 5 nm to about 5 µm.

The negative active material may have a structure in which the metal oxide in a particulate form forms the shell that entirely covers a surface of the silicon alloy core.

The silicon alloy core may have pores therein.

The metal oxide included in the shell may be partially dispersed in the pores.

The silicon alloy core may be represented by Formula 1 below:

<Formula 1>

In Formula 1, x, y, z, and w refer to atomic percentages (at %), $0<x\leq90$, $0<y\leq20$, $0<z\leq5$, $0<w\leq30$, and $x+y+z+w=100$, and X may include one or more of carbon, molybdenum, niobium, tungsten, tantalum, copper, vanadium, chromium, nickel, cobalt, zirconium, or yttrium.

In Formula 1, $0<w$ and X may be carbon (C).

Embodiments are also directed to a negative electrode including the negative active material according to an embodiment.

Embodiments are also directed to a lithium secondary battery, including the negative electrode according to an embodiment, a positive electrode, and an electrolyte between the negative electrode and the positive electrode.

Embodiments are also directed to a method of preparing a negative active material, the method including preparing a silicon alloy core including silicon, iron, and manganese, and preparing the negative active material according to an embodiment by mixing the silicon alloy core and a metal oxide by mechanical milling.

The mechanical milling may include one or more of planetary ball milling, vibratory ball milling, or attrition milling.

BRIEF DESCRIPTION OF THE DRAWINGS

Features will become apparent to those of ordinary skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. In the drawing figures, the dimensions of layers and regions may be exaggerated for clarity of illustration. Like reference numerals refer to like elements throughout.

As used herein, the term "and/or" includes any and all combinations of one or more of the associated listed items. Expressions such as "at least one of," when preceding a list of elements, modify the entire list of elements and do not modify the individual elements of the list.

Hereinafter, a negative active material according to an embodiment, a negative electrode and lithium secondary battery including the same, and a method of preparing the negative active material will be described in detail with reference to the accompanying drawings. The embodiments described below are provided only for illustrative purposes and are not intended to limit the scope of the invention, and the present disclosure should be defined by the scope of the following claims.

Unless otherwise specifically stated herein, the terms such as "including" or "comprising" as used herein are not intended to preclude other elements, but are intended to indicate that other elements may be added and/or intervening elements may be present.

A negative active material according to an embodiment includes: a silicon alloy core including silicon, iron, and manganese; and, on the silicon alloy core, a shell including a metal oxide including at least one metal selected from titanium (Ti), zirconium (Zr), aluminum (Al), cobalt (Co), and lithium (Li), in which an amount of the metal oxide may range from greater than 0 wt % to less than about 12 wt % based on a total weight of the negative active material.

The negative active material may include, on the silicon alloy core including silicon, iron, and manganese, the shell including a metal oxide including at least one metal selected from Ti, Zr, Al, Co, and Li. The negative active material may reduce a side reaction with an electrolyte occurring during charging and discharging. In addition, the metal oxide included in the shell of the negative active material is uniformly disposed in a particulate form without heat treatment, and thus a lithium secondary battery including the negative active material may have enhanced lifespan characteristics.

The amount of the metal oxide may range from greater than 0 wt % to less than about 12 wt % based on the total weight of the negative active material. For example, the amount of the metal oxide may range from greater than 0 wt % to about 11 wt % based on the total weight of the negative active material. For example, the amount of the metal oxide may range from greater than 0 wt % to about 10 wt % based on the total weight of the negative active material. For example, the amount of the metal oxide may range from greater than 0 wt % to about 9 wt % based on the total weight of the negative active material. For example, the amount of the metal oxide may range from greater than 0 wt % to about 8 wt % based on the total weight of the negative active material. For example, the amount of the metal oxide may range from greater than 0 wt % to about 7 wt % based on the total weight of the negative active material. For example, the amount of the metal oxide may range from greater than 0 wt % to about 6 wt % based on the total weight of the negative active material.

When the amount of the metal oxide is within the above-described ranges, the negative active material including a silicon alloy core may have an appropriate size. Due to this, volumetric expansion thereof may be appropriately controlled and, accordingly, a lithium secondary battery including the negative active material may have enhanced lifespan characteristics.

The negative active material may have a median particle diameter D50 of, for example, about 0.3 μm to about 20 μm, for example, about 1 μm to about 20 μm, for example, about 1 μm to about 10 μm. The term "D50" as used herein means, assuming that a total number of particles is 100%, a particle size value at which 50% of particles are smaller on a cumulative distribution curve represented in order of the smallest particles to the largest particles. The D50 value may be measured using one of various methods well known in the art, for example, using a particle size analyzer, or from a transmission electron microscopy (TEM) image or a scanning electron microscopy (SEM) image. In another embodiment, by performing measurement using a measurement device using dynamic light scattering and then performing data analysis on the measured values to count the number of particles for each particle size range, the D50 value may be easily obtained by calculation therefrom.

The metal oxide may include at least one selected from $TiO_2$, $ZrO_2$, $Al_2O_3$, $Co_3O_4$, $Li_2ZrO_3$, and $LiTi_2O_4$. The metal oxide may be $TiO_2$.

The metal oxide is inert with respect to lithium, and thus, may not react with lithium to form a lithium metal oxide. The metal oxide may simply act as a conductor which is a path for transfer of lithium ions and/or electrons, and may also act as a protective layer for prevention of the side reaction with an electrolyte. In other words, the metal oxide may be electrically insulating and also act as a protective layer for prevention of the side reaction with an electrolyte.

The metal oxide may be metal oxide particles having a median particle diameter D50 of about 5 nm to about 5 μm. For example, the metal oxide may have a median particle diameter D50 of about 10 nm to about 2 μm, for example, about 10 nm to about 1 μm. The D50 value may be obtained by measurement using one of the known methods described above and calculation therefrom.

The negative active material may have a structure in which the metal oxide in a particulate form that forms a shell entirely covers a surface of the silicon alloy core. The negative active material may have a structure in which the metal oxide in a particulate form that forms a shell entirely covers the surface of the silicon alloy core at a predetermined uniform interval. Thus, in the negative active material, volumetric expansion of the silicon alloy core may be effectively controlled and the side reaction thereof with an electrolyte may be prevented. Accordingly, a lithium secondary battery including the negative active material may have further enhanced charge/discharge characteristics such as initial efficiency and lifespan characteristics.

The silicon alloy core may have pores therein.

The metal oxide included in the shell may be partially dispersed in the pores. The metal oxide may be partially dispersed in a particulate form in the pores. Thus, the volumetric expansion of the silicon alloy core during charging and discharging may be more effectively controlled. Accordingly, a lithium secondary battery including the negative active material may have further enhanced lifespan characteristics.

Figure 1:
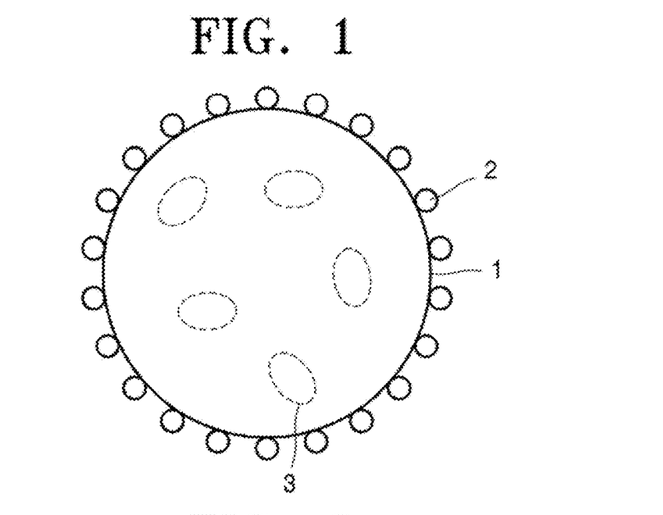
FIG. 1 illustrates a schematic view of a negative active material according to an embodiment.

FIG. 1 is a schematic view of a negative active material 10 according to an embodiment.

Referring to FIG. 1, the negative active material 10 includes a silicon alloy core 1 and, on the silicon alloy core 1, a shell 2 including a metal oxide. The shell 2 is formed by entirely covering the silicon alloy core 1 with particles of the metal oxide at a predetermined uniform interval. The negative active material 10 has pores 3 inside the silicon alloy core 1, and the metal oxide particles are dispersed in the pores 3.

The silicon alloy core may be represented by Formula 1 below:

$$Si_xFe_yMn_zX_w \qquad \text{<Formula 1>}$$

In Formula 1, x, y, z, and w refer to atomic percentages (at %);

$0<x\le 90$, $0<y\le 20$, $0<z\le 5$, $0<w\le 30$, and $x+y+z+w=100$; and

X may be at least one selected from carbon (C), molybdenum (Mo), niobium (Nb), tungsten (W), tantalum (Ta), copper (Cu), vanadium (V), chromium (Cr), nickel (Ni), cobalt (Co), zirconium (Zr), and yttrium (Yt).

In Formula 1 above, $50<x\le 90$, for example, $70<x\le 90$.

In Formula 1 above, $0<y\le 18$, for example, $0<y\le 16$.

In Formula 1 above, $0<z\le 4$, for example, $0<z\le 2$.

In Formula 1 above, $10\le w\le 20$, for example, $10\le w\le 15$.

The silicon alloy core introduces a buffer matrix for reducing volumetric expansion of silicon by alloying silicon (Si) with iron (Fe) and manganese (Mn), and thus, the negative active material including the silicon alloy core may have high capacity and enhanced lifespan characteristics.

In Formula 1 above, X may be carbon (C).

An amount of the carbon may range from about 1 wt % to about 5 wt %, for example, about 3 wt % to about 5 wt %, based on a total weight of the negative active material. The carbon provides an electrically conductive path in the negative active material, and thus conductivity of the negative active material may be enhanced. In addition, the carbon may also act as a buffer layer for volumetric expansion of the silicon alloy core during charging and discharging of a lithium secondary battery. Thus, the negative active material including the silicon alloy core including carbon may have further enhanced charge/discharge characteristics such as initial efficiency and lifespan characteristics.

A negative electrode according to another embodiment may include the negative active material described above.

A lithium secondary battery according to another embodiment may include: the negative electrode described above; a positive electrode; and an electrolyte between the negative electrode and the positive electrode.

First, the negative electrode may be manufactured as follows.

A negative active material, a conductive agent, a binder, and a solvent are mixed to prepare a negative electrode slurry composition. The negative electrode slurry composition may be directly coated onto a negative current collector and the resulting negative current collector may be dried to thereby complete the manufacture of a negative electrode including a negative active material layer. In another embodiment, the negative electrode slurry composition may be cast onto a separate support and a film separated from the support may be laminated on a negative current collector to thereby complete the manufacture of a negative electrode having a negative active material layer.

The negative active material may be the negative active material described above.

In addition, the negative active material may include, in addition to the negative active materials described above, any negative active material that may be used as a negative active material of a lithium secondary battery. For example, the negative active material may include at least one selected from lithium metal, a metal alloyable with lithium, a transition metal oxide, a non-transition metal oxide, and a carbonaceous material.

For example, the metal alloyable with lithium may be silicon (Si), tin (Sn), aluminum (Al), germanium (Ge), lead (Pb), bismuth (Bi), antimony (Sb), a Si—Y' alloy (Y' is an alkali metal, an alkali earth metal, Group 13 and 14 elements, a transition metal, a rare earth element, or a combination thereof except for Si), a Sn—Y' alloy (Y' is an alkali metal, an alkali earth metal, Group 13 and 14 elements, a transition metal, a rare earth element, or a combination thereof except for Sn, or the like. Examples of Y' may include magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), and combinations thereof.

For example, the transition metal oxide may be lithium titanate oxide, vanadium oxide, lithium vanadium oxide, or the like.

For example, the non-transition metal oxide may be $SnO_2$, $SiO_x$, where $0<x<2$, or the like.

The carbonaceous material may be crystalline carbon, amorphous carbon, or a mixture thereof. Examples of the crystalline carbon include natural graphite and artificial graphite, each having a random form or having a plate, flake, spherical, or fibrous form. Non-limiting examples of the amorphous carbon include soft carbon (low-temperature calcined carbon), hard carbon, mesophase pitch carbides, and calcined coke.

Examples of the conductive agent include graphite particulates and natural or artificial graphite; carbon black, acetylene black, and Ketjen black; carbon fibers; carbon nanotubes; metal powders, fibers, or tubes of copper, nickel, aluminum, and silver; and conductive polymers such as polyphenylene derivatives. However, the conductive agent is not limited to the above examples and may be any conductive agent used in the art.

The binder may be either an aqueous binder or a non-aqueous binder. An amount of the binder may range from about 0.1 parts by weight to about 10 parts by weight based on a total weight (100 parts by weight) of the negative active material composition. When the amount of the binder is within the above range, adhesion between the negative electrode and a current collector is high.

The aqueous binder may be styrene-butadiene rubber (SBR), polyvinyl alcohol, carboxymethylcellulose, hydroxypropylcellulose, diacetyl cellulose, or a mixture thereof. The SBR binder may be dispersed in water as an emulsion, thus not requiring an organic solvent, and has high adhesive strength. Accordingly, a high-capacity lithium secondary battery may be manufactured using the binder in a decreased amount and the negative active material in an increased amount. The aqueous binder is used together with an aqueous solvent such as water or an alcoholic solvent miscible with water. When the aqueous binder is used, a thickening agent may further be used for adjustment of viscosity. The thickening agent may be at least one selected from carboxymethylcellulose, hydroxymethylcellulose, hydroxyethylcellulose, and hydroxypropylcellulose. An amount of the thickening agent may range from about 0.8 wt % to about 5 wt %, for example, about 1 wt % to about 5 wt %, for example, about 1 wt % to about 2 wt %, based on the total weight of the negative active material composition.

When the amount of the thickening agent is within the ranges described above, a current collector may be easily coated with a negative active material layer-forming composition without a decrease in capacity of a lithium secondary battery.

The non-aqueous binder may be one selected from polyvinyl chloride, polyvinyl pyrrolidone, polytetrafluoroethylene, polyvinylidene fluoride, polyethylene, polypropylene, and mixtures thereof. The non-aqueous binder may be used together with a non-aqueous solvent selected from N-methyl-2-pyrrolidone (NMP), dimethylformamide, tetrahydrofuran, and mixtures thereof.

In some embodiments, the negative electrode slurry composition may further include a plasticizer to form pores in an electrode plate.

The amounts of the negative active material, the conductive agent, the binder, and the solvent may be the same as those used in general lithium secondary batteries.

The term "negative electrode slurry composition" as used herein indicates that it includes, in addition to the negative active material, a conductive agent, a binder, and a solvent, and is distinguished from the negative active material.

The negative current collector is generally fabricated to have a thickness of about 3 µm to about 500 µm. The negative current collector is not particularly limited so long as it causes no chemical change in the fabricated battery and has conductivity. Non-limiting examples of the negative current collector include copper; stainless steel; aluminum; nickel; titanium; sintered carbon; copper or stainless steel that is surface-treated with carbon, nickel, titanium, or silver; and aluminum-cadmium alloys. In addition, the negative current collector may be processed to have fine irregularities on surfaces thereof so as to enhance adhesion of the current collector to the negative active material, and may be used in any of various forms including films, sheets, foils, nets, porous structures, foams, and non-woven fabrics.

Meanwhile, the positive electrode may be manufactured as follows. The positive electrode may be manufactured using the same method as that used to manufacture the negative electrode, except that a positive active material is used instead of the negative active material. In addition, in a positive electrode slurry composition, a conductive agent, a binder, and a solvent may be the same as those used for the negative electrode.

For example, the positive active material, the conductive agent, the binder, and the solvent are mixed to prepare the positive electrode slurry composition. The positive electrode slurry composition may be directly coated onto a positive current collector and the resulting positive current collector may be dried to thereby complete the manufacture of a positive electrode having a positive active material layer. In another embodiment, the positive electrode slurry composition may be cast onto a separate support and a film separated from the support may be laminated on a positive current collector to thereby complete the manufacture of a positive electrode having a positive active material layer.

As the positive active material, any lithium-containing metal oxide commonly used in the art may be used. For example, the positive active material may be at least one selected from composite oxides of lithium and a metal selected from cobalt, manganese, nickel, and combinations thereof. For example, the positive active material may be a compound represented by any one of the following formulae: $Li_aA_{1-b}B'_bD'_2$ where $0.90 \leq a \leq 1$ and $0 \leq b \leq 0.5$; $Li_aE_{1-b}B'_bO_{2-c}D'_c$ where $0.90 \leq a \leq 1$, $0 \leq b \leq 0.5$, and $0 \leq c \leq 0.05$; $LiE_{2-b}B'_bO_{4-c}D'_c$ where $0 \leq b \leq 0.5$ and $0 \leq c \leq 0.05$; $Li_aNi_{1-b-c}Co_bB'_cD'_\alpha$ where $0.90 \leq a \leq 1$, $0 \leq b \leq 0.5$, $0 \leq c \leq 0.05$, and $0 < \alpha \leq 2$; $Li_aNi_{1-b-c}Co_bB'_cO_{2-\alpha}F'_\alpha$ where $0.90 \leq a \leq 1$, $0 \leq b \leq 0.5$, $0 \leq c \leq 0.05$, and $0 < \alpha < 2$; $Li_aNi_{1-b-c}Co_bB'_cO_{2-\alpha}F'_2$ where $0.90 \leq a \leq 1$, $0 \leq b \leq 0.5$, $0 \leq c \leq 0.05$, and $0 < \alpha < 2$; $Li_aNi_{1-b-c}Mn_bB'_cD'_\alpha$ where $0.90 \leq a \leq 1$, $0 \leq b \leq 0.5$, $0 \leq c \leq 0.05$, and $0 < \alpha \leq 2$; $Li_aNi_{1-b-c}Mn_bB'_cO_{2-\alpha}F'_\alpha$ where $0.90 \leq a \leq 1$, $0 \leq b \leq 0.5$, $0 \leq c \leq 0.05$, and $0 < \alpha < 2$; $Li_aNi_{1-b-c}Mn_bB'_cO_{2-\alpha}F'_2$ where $0.90 \leq a \leq 1$, $0 \leq b \leq 0.5$, $0 \leq c \leq 0.05$, and $0 < \alpha < 2$; $Li_aNi_bE_cG_dO_2$ where $0.90 \leq a \leq 1$, $0 \leq b \leq 0.9$, $0 \leq c \leq 0.5$, and $0.001 \leq d \leq 0.1$; $Li_aNi_bCo_cMn_dG_eO_2$ where $0.90 \leq a \leq 1$, $0 \leq b \leq 0.9$, $0 \leq c \leq 0.5$, $0 \leq d \leq 0.5$, and $0.001 \leq e \leq 0.1$; $Li_aNiG_bO_2$ where $0.90 \leq a \leq 1$ and $0.001 \leq b \leq 0.1$; $Li_aCoG_bO_2$ where $0.90 \leq a \leq 1$ and $0.001 \leq b \leq 0.1$; $Li_aMnG_bO_2$ where $0.90 \leq a \leq 1$ and $0.001 \leq b \leq 0.1$; $Li_aMn_2G_bO_4$ where $0.90 \leq a \leq 1$ and $0.001 \leq b \leq 0.1$; $QO_2$; $QS_2$; $LiQS_2$; $V_2O_5$; $LiV_2O_5$; $LiI'O_2$; $LiNiVO_4$; $Li_{(3-f)}J_2(PO_4)_3$ where $0 \leq f \leq 2$; $Li_{(3-f)}Fe_2(PO_4)_3$ where $0 \leq f \leq 2$; and $LiFePO_4$.

In the above formulae, A is nickel (Ni), cobalt (Co), manganese (Mn), or a combination thereof; B' is aluminum (Al), Ni, Co, Mn, chromium (Cr), iron (Fe), magnesium (Mg), strontium (Sr), vanadium (V), a rare earth element, or a combination thereof; D' is oxygen (O), fluorine (F), sulfur (S), phosphorus (P), or a combination thereof; E is Co, Mn, or a combination thereof; F' is F, S, P, or a combination thereof; G is Al, Cr, Mn, Fe, Mg, lanthanum (La), cerium (Ce), strontium (Sr), V, or a combination thereof; Q is titanium (Ti), molybdenum (Mo), Mn, or a combination thereof; I' is Cr, V, Fe, scandium (Sc), yttrium (Y), or a combination thereof; and J is V, Cr, Mn, Co, Ni, copper (Cu), or a combination thereof.

The compounds described above having a coating layer on surfaces thereof may be used, or the compounds described above and the compounds described above having a coating layer on surfaces thereof may be used in combination. The coating layer may include a coating element compound, such as an oxide of a coating element, a hydroxide of a coating element, an oxyhydroxide of a coating element, an oxycarbonate of a coating element, or a hydroxycarbonate of a coating element. The coating element compounds may be amorphous or crystalline. The coating element included in the coating layer may be Mg, Al, Co, K, Na, Ca, Si, Ti, V, Sn, Ge, Ga, B, As, Zr, or a mixture thereof. A coating layer may be formed using the coating elements in the aforementioned compounds by using any one of various coating methods (e.g., spray coating or immersion) that do not adversely affect physical properties of the positive active material. This is well understood by those of ordinary skill in the art, and thus, a detailed description thereof is not provided herein.

The amounts of the positive active material, the conductive agent, the binder, and the solvent are the same as those used in general lithium secondary batteries. At least one of the conductive agent, the binder, and the solvent may not be used according to a use and a constitution of desired lithium secondary batteries.

The positive current collector is generally fabricated to a thickness of about 3 µm to about 500 µm. The positive current collector is not particularly limited so long as it causes no chemical change in the fabricated battery and has conductivity. Non-limiting examples of the positive current collector include copper; stainless steel; aluminum; nickel; titanium; sintered carbon; copper or stainless steel that is surface-treated with carbon, nickel, titanium, or silver; and aluminum-cadmium alloys. In addition, the positive current collector may be processed to have fine irregularities on surfaces thereof so as to enhance adhesion of the current collector to the positive active material, and may be used in any of various forms including films, sheets, foils, nets, porous structures, foams, and non-woven fabrics.

The positive electrode may have a mixed density of at least 2.0 g/cc.

The positive electrode and the negative electrode may be separated from each other by a separator, and any separator commonly used in lithium secondary batteries may be used. In particular, a separator having low resistance to transfer of ions in an electrolyte and having an excellent electrolyte-retaining ability may be used. For example, the separator may be made of one selected from glass fiber, polyester, Teflon, polyethylene, polypropylene, polytetrafluoroethylene (PTFE), and combinations thereof, each of which may be a non-woven or woven fabric. The separator has a pore diameter of about 0.01 μm to about 10 μm and generally has a thickness of about 5 μm to about 300 μm.

A lithium salt-containing non-aqueous electrolyte includes a non-aqueous electrolyte and a lithium salt. The non-aqueous electrolyte may be a non-aqueous electrolytic solution, an organic solid electrolyte, an inorganic solid electrolyte, or the like.

Non-limiting examples of the non-aqueous electrolytic solution may be aprotic organic solvents such as N-methyl-2-pyrrolidinone, propylene carbonate, ethylene carbonate, butylene carbonate, dimethyl carbonate, diethyl carbonate, γ-butyrolactone, 1,2-dimethoxy ethane, tetrahydrofuran, 2-methyltetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Non-limiting examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Non-limiting examples of the inorganic solid electrolyte include nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt may be any lithium salt commonly used in lithium secondary batteries which is a material readily soluble in the non-aqueous electrolyte. The lithium salt may be, for example, at least one selected from $LiCl$, $LiBr$, $LiI$, $LiClO_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic carboxylic acid lithium, lithium tetraphenyl borate, and imide.

Lithium secondary batteries may be classified as lithium-ion secondary batteries, lithium-ion polymer secondary batteries, and lithium polymer secondary batteries according to the types of separator and electrolyte included therein. In addition, lithium secondary batteries may be classified as cylindrical, rectangular, coin-type, and pouch-type batteries according to a shape thereof, and as bulk-type and thin-film-type according to a size thereof.

Methods of manufacturing these batteries are well known in the art, and thus, a detailed description thereof is not provided herein.

Figure 2:
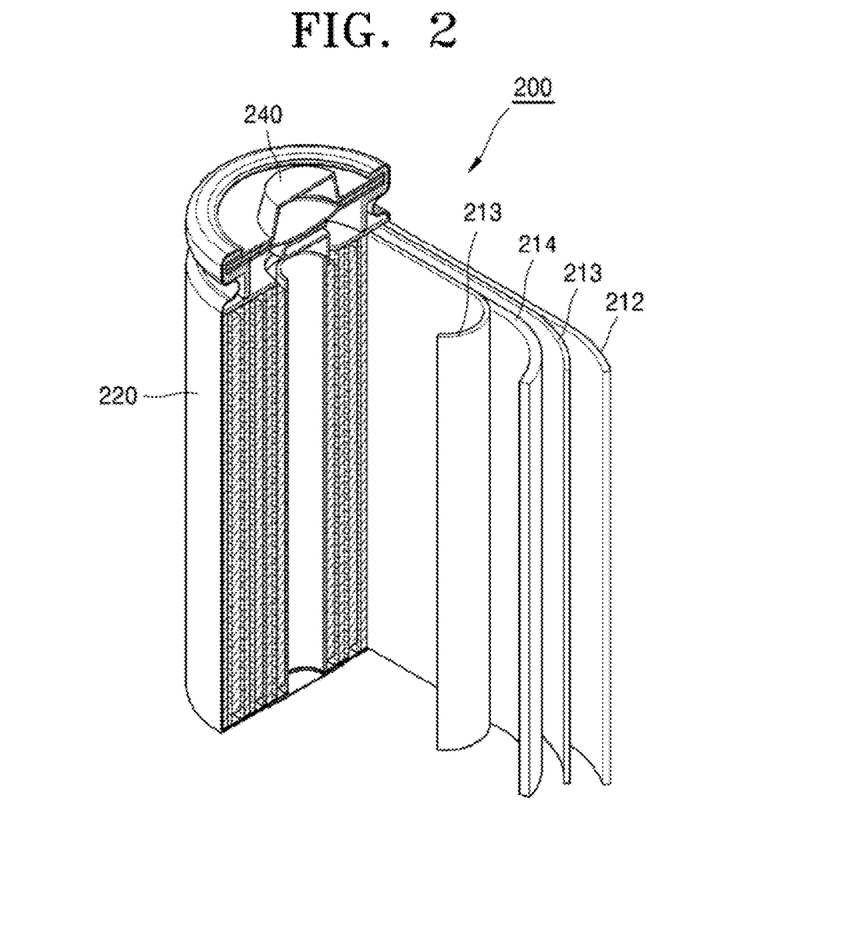
FIG. 2 illustrates a schematic view illustrating a structure of a lithium secondary battery according to an embodiment.

FIG. 2 is a schematic view illustrating a structure of a lithium secondary battery 200 according to an embodiment.

As illustrated in FIG. 2, the lithium secondary battery 200 includes a positive electrode 214, a separator 213, and a negative electrode 212. The positive electrode 214, the separator 213, and the negative electrode 212 are wound or folded, and then accommodated in a battery case 220. Subsequently, an organic electrolyte is injected into the battery case 220 and the battery case 220 is sealed by a sealing member 240 to thereby complete the manufacture of the lithium secondary battery 200. The battery case 220 may have a cylindrical shape, a rectangular shape, a thin-film shape, or the like. For example, the lithium secondary battery 200 may be a large-scale thin film-type battery. The lithium secondary battery 200 may be, for example, a lithium-ion secondary battery.

A separator may be disposed between the positive electrode and the negative electrode to form a battery assembly. A plurality of battery assemblies may be stacked in a bi-cell structure and impregnated with an organic electrolytic solution, and the resultant structure may be put into a pouch and hermetically sealed to thereby complete the manufacture of a lithium-ion polymer secondary battery.

In addition, the battery assemblies may be stacked to form a battery pack, and such a battery pack may be used in any devices requiring high capacity and high-power output. For example, the battery pack may be used in notebook computers, smartphones, motor-driven tools, electric vehicles, and the like.

In addition, the lithium secondary battery may be used in electric vehicles (EVs). For example, the lithium secondary battery may be used in hybrid vehicles such as plug-in hybrid electric vehicles (PHEVs), and the like.

A method of preparing the negative active material, according to another embodiment includes: preparing a silicon alloy core including silicon, iron, and manganese; and preparing the negative active material described above by mixing the silicon alloy core and a metal oxide by mechanical milling.

First, a silicon alloy core including silicon, iron, and manganese is prepared. The composition of the silicon alloy core is the same as described above, and thus, a detailed description thereof is not provided herein.

The preparation method of the silicon alloy core is not particularly limited and the silicon alloy core may be obtained by, for example, milling silicon powder, iron powder, and manganese powder in a reactor at an appropriate ratio of atomic percentages thereof. The milling process may be performed by ball milling, planetary ball milling, high-energy milling, or the like. The milling process may be performed at a stirring rate of about 300 rpm to about 700 rpm for about 6 hours to about 25 hours.

Next, the silicon alloy core and a metal oxide are mixed by mechanical milling to prepare the negative active material described above.

Examples of the mechanical milling may include planetary ball milling, vibratory ball milling, and attrition milling. For example, the mechanical milling may be attrition milling.

Generally, a heat treatment process is performed at a temperature of about 700° C. to about 1200° C. to form a carbonaceous coating layer on a silicon alloy core, but this process makes the negative active material including the silicon alloy core have coarse crystals and, accordingly, may further worsen volumetric expansion of the negative active material during charging and discharging of a lithium secondary battery.

As an example of the milling method, attrition milling provides a faster pulverization rate than other mechanical milling methods, and thus a metal oxide having a small particle size may be easily obtained. Accordingly, a shell including a homogeneous metal oxide may be easily formed on the silicon alloy core. Thus, a lithium secondary battery including the negative active material described above may have further enhanced charge/discharge characteristics such as initial efficiency and lifespan characteristics.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

EXAMPLES

Preparation of Negative Active Material

Example 1: Preparation of Negative Active Material

Silicon powder having a median particle diameter of 5 μm (manufactured by High Purity Chemical Laboratory, ≥99%), iron powder having a median particle diameter of 3 μm to 5 μm (manufactured by High Purity Chemical Laboratory, ≥99%), manganese powder having a median particle diameter of 3 μm to 5 μm (manufactured by High Purity Chemical Laboratory, ≥99%), and graphite powder having a median particle diameter of 5 μm (manufactured by High Purity Chemical Laboratory, ≥99%) were prepared as starting materials.

The silicon powder, the iron powder, the manganese powder, and the graphite powder were added into a planetary ball mill (manufactured by Fritsch, P-5) at an atomic percentage (at %) ratio of 70:16:2:12 and then mixed and pulverized at 330 rpm for 8 hours to obtain a silicon alloy core having the formula of $Si_{70}Fe_{16}Mn_2C_{12}$.

120 g of the $Si_{70}Fe_{16}Mn_2C_{12}$ core and 3.72 g of $TiO_2$ (about 3 wt %) were added to an attrition mill (manufactured by KM-tech, KMAM-3C) and then mixed and pulverized at 600 rpm for 30 minutes to thereby complete the preparation of a negative active material including a shell formed of $TiO_2$ particles on the $Si_{70}Fe_{16}Mn_2C_{12}$ core.

Example 2: Preparation of Negative Active Material

A negative active material was prepared in the same manner as in Example 1, except that 7.66 g of $TiO_2$ (about 6 wt %) was added instead of 3.72 g of $TiO_2$ (about 3 wt %).

Example 3: Preparation of Negative Active Material

A negative active material was prepared in the same manner as in Example 1, except that 11.87 g of $TiO_2$ (about 9 wt %) was added instead of 3.72 g of $TiO_2$ (about 3 wt %).

Comparative Example 1: Preparation of Negative Active Material

The $Si_{70}Fe_{16}Mn_2C_{12}$ core as the silicon alloy core prepared according to Example 1 was used as a negative active material.

Comparative Example 2: Preparation of Negative Active Material

A negative active material was prepared in the same manner as in Example 1, except that 1.83 g (about 1.5 wt %) of carbon black (Ketjen Black®) was added instead of 3.72 g of $TiO_2$ (about 3 wt %).

Comparative Example 3: Preparation of Negative Active Material

A negative active material was prepared in the same manner as in Example 1, except that 15.27 g of $TiO_2$ (about 12 wt %) was added instead of 3.72 g of $TiO_2$ (about 3 wt %).

Manufacture of Lithium Secondary Battery (Coin Half-Cell)

Example 4: Manufacture of Lithium Secondary Battery (Coin Half-Cell)

The negative active material of Example 1, carbon black (Ketjen Black®) as a conductive agent, and poly(isobutylene-co-maleic anhydride) (LPIMAM37(B)), manufactured by Aekyung Chemical) as a binder were mixed in a mixer to prepare a negative active material composition. In the negative active material composition, the negative active material, the conductive agent, and the binder were mixed in a weight ratio of 91:1:8.

The negative active material composition was coated onto copper foil (thickness: about 10 μm) by using a doctor blade, the resulting copper foil was dried at 25° C., and further dried in a vacuum at about 120° C. to thereby complete the manufacture of a negative electrode.

Separately, $Li(Ni_{0.6}Co_{0.2}Mn_{0.2})O_2$ as a positive active material, Super-P as a conductive agent (manufactured by Timcal Ltd.), polyvinylidene fluoride (PVdF), and N-pyrrolidone were mixed to obtain a positive active material composition. In the positive active material composition, the positive active material, the conductive agent, and PVDF were mixed in a weight ratio of 97:1.5:1.5.

The positive active material composition was coated onto aluminum foil (thickness: about 15 μm) by using a doctor blade, the resulting aluminum foil was dried at 25° C., and further dried in a vacuum at about 110° C. to thereby complete the manufacture of a positive electrode. The negative electrode and the positive electrode were then assembled to manufacture a lithium secondary battery (coin half-cell, CR2032 type) having a diameter of 20 mm.

In this regard, a polyethylene/polypropylene separator was used, and a solution prepared by dissolving 1.0 M $LiPF_6$ in a mixed solvent of EC:DEC:FEC in a volume ratio of 5:70:25 was used as an electrolyte.

Examples 5 and 6: Manufacture of Lithium Secondary Battery (Coin Half-Cell)

Lithium secondary batteries were manufactured in the same manner as in Example 4, except that the negative active materials prepared according to Examples 2 and 3 were respectively used instead of the negative active material of Example 1.

Comparative Examples 4 to 6: Manufacture of Lithium Secondary Battery (Coin Half-Cell)

Lithium secondary batteries were manufactured in the same manner as in Example 4, except that the negative active materials prepared according to Comparative Examples 1 to 3 were respectively used instead of the negative active material of Example 1.

Manufacture of Lithium Secondary Battery (Coin Full-Cell)

Example 7: Manufacture of Lithium Secondary Battery (Coin Full-Cell)

The negative active material of Example 1, carbon black (Ketjen Black®) as a conductive agent, and poly isobutylene-co-maleic anhydride (LPIMAM37(B), manufactured by Aekyung Chemical) as a binder were mixed in a mixer to prepare a negative active material composition. In the negative active material composition, the negative active material, the conductive agent, and the binder were mixed in a weight ratio of 91:1:8.

The negative active material composition was coated onto copper foil (thickness: about 10 μm) by using a doctor blade, the resulting copper foil was dried at 25° C., and then further dried in a vacuum at about 120° C. to thereby complete the manufacture of a negative electrode.

Separately, $Li(Ni_{0.6}Co_{0.2}Mn_{0.2})O_2$ as a positive active material, Super-P as a conductive agent (manufactured by Timcal Ltd.), polyvinylidene fluoride (PVDF), and N-pyrrolidone were mixed to obtain a positive active material composition. In the positive active material composition, the positive active material, the conductive agent, and PVDF were mixed in a weight ratio of 97:1.5:1.5.

The positive active material composition was coated onto aluminum foil (thickness: about 15 μm) by using a doctor blade, the resulting aluminum foil was dried at 25° C., and then further dried in a vacuum at about 110° C. to thereby complete the manufacture of a positive electrode.

An electrolyte was injected between the positive and negative electrodes manufactured according to the above processes, thereby completing the manufacture of a lithium secondary battery (coin full-cell). In this regard, a polyethylene/polypropylene separator was disposed between the positive electrode and the electrolyte, and a liquid electrolyte was added thereto. A solution prepared by dissolving 1.0 M $LiPF_6$ in a mixed solvent of EC:DEC:FEC in a volume ratio of 5:70:25 was used as the liquid electrolyte.

Examples 8 and 9: Manufacture of Lithium Secondary Battery (Coin Full-Cell)

Lithium secondary batteries were manufactured in the same manner as in Example 7, except that the negative active materials prepared according to Examples 2 and 3 were respectively used instead of the negative active material of Example 1.

Comparative Examples 7 to 9: Manufacture of Lithium Secondary Battery (Coin Full-Cell)

Lithium secondary batteries were manufactured in the same manner as in Example 7, except that the negative active materials of Comparative Examples 1 to 3 were respectively used instead of the negative active material of Example 1.

Analysis of Negative Active Materials

Figure 3A:
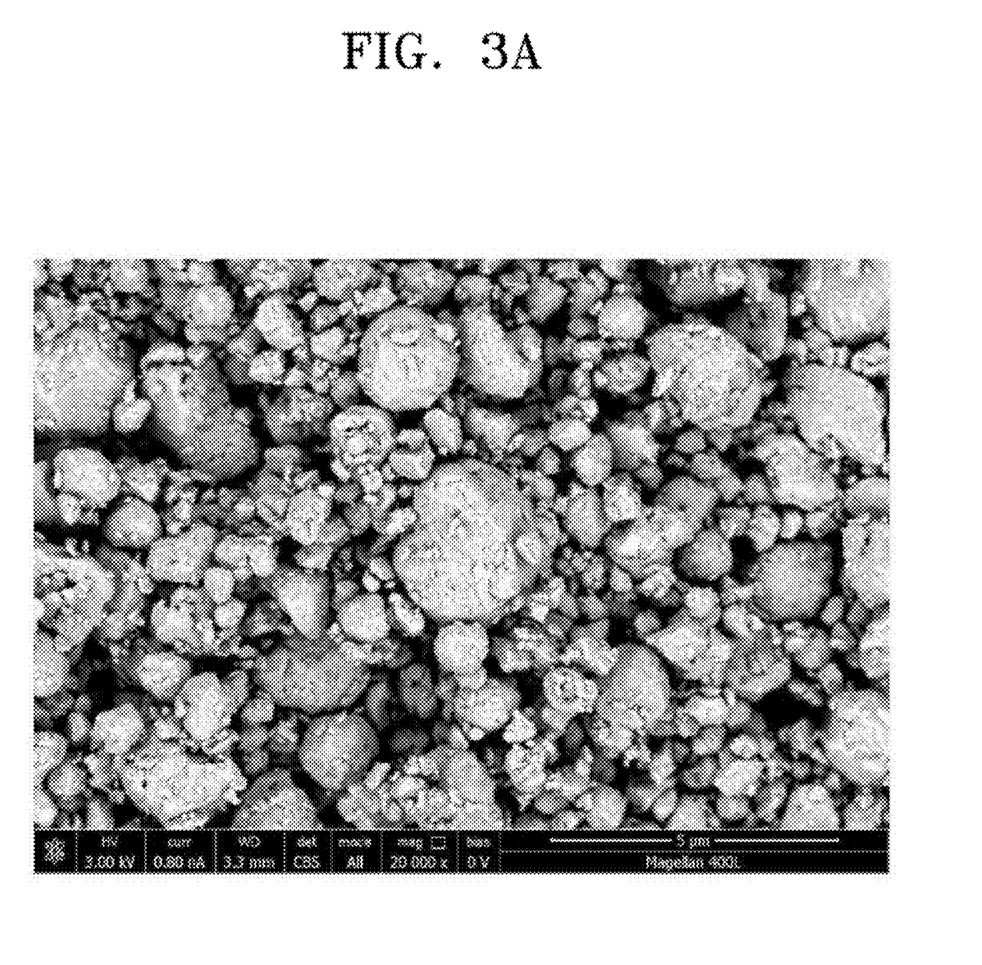
FIGS. 3A and 3B illustrate scanning electron microscope (SEM) images of a negative active material prepared according to Example 1 at magnifications of ×20,000 and ×40,000, respectively.
Figure 3B:
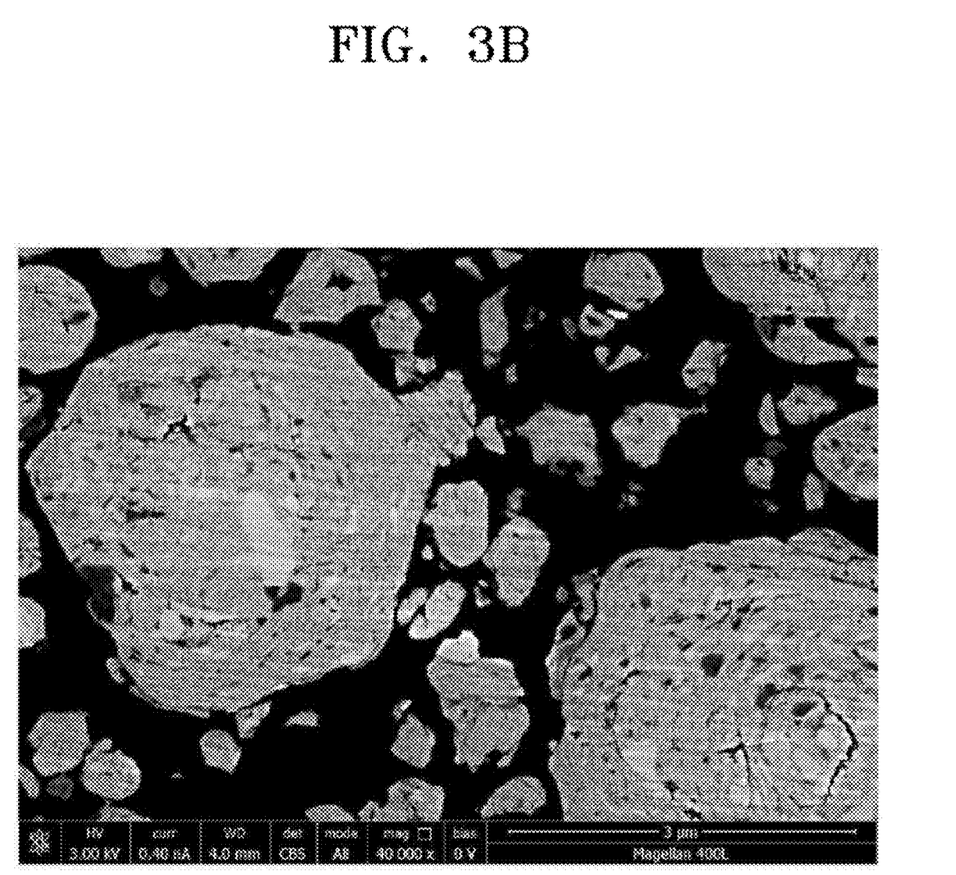
Figure 4:
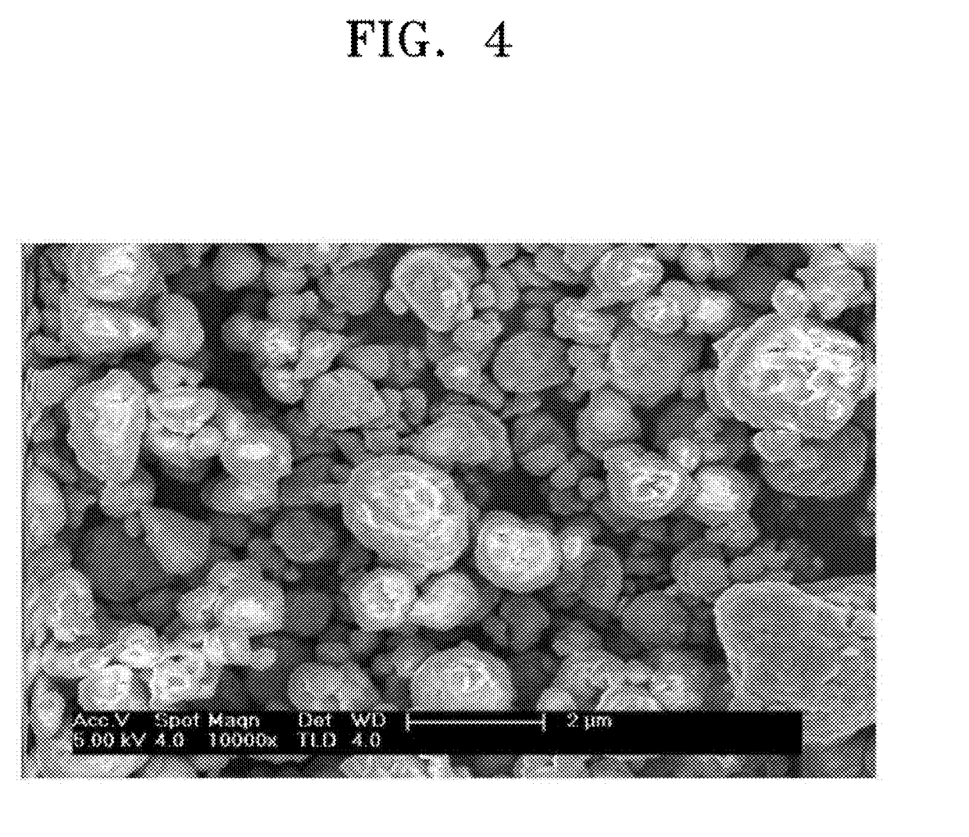
FIG. 4 illustrates an SEM image of a negative active material prepared according to Comparative Example 1, in which the negative active material was observed at a magnification of ×10,000.

Analysis Example 1: Analysis of Negative Active Materials—Scanning Electron Microscopy (SEM) Analysis and Energy Dispersive X-Ray (EDX) Analysis 1-1: SEM Analysis A surface and cross-section of the negative active material of Example 1 were observed using SEM at magnifications of ×20,000 and ×40,000. The observation results are shown in FIGS. 3A and 3B, respectively. In addition, a surface of the negative active material of Comparative Example 1 was observed using SEM at a magnification of ×10,000. The results are shown in FIG. 4.

Referring to FIGS. 3A and 3B, it was confirmed that the negative active material of Example 1 included metal oxide particles on a surface thereof. From the results, it was confirmed that pores were formed in the negative active material. Referring to FIG. 4, it was confirmed that the negative active material of Comparative Example 1 did not include metal oxide particles on a surface thereof.

1-2: EDX Analysis

Figure 3C:
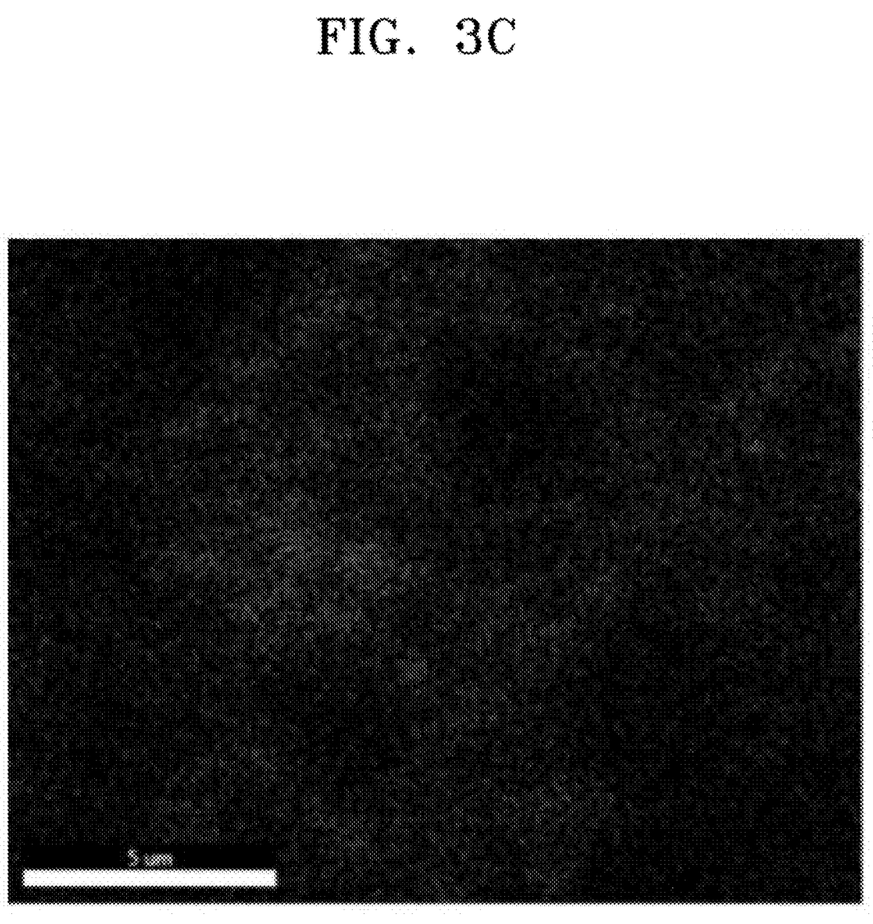
FIGS. 3C to 3E illustrate images showing energy dispersive X-ray (EDX) analysis results of the negative active material of Example 1, in which the EDX analysis was performed to analyze distribution of titanium, carbon, and oxygen.
Figure 3D:
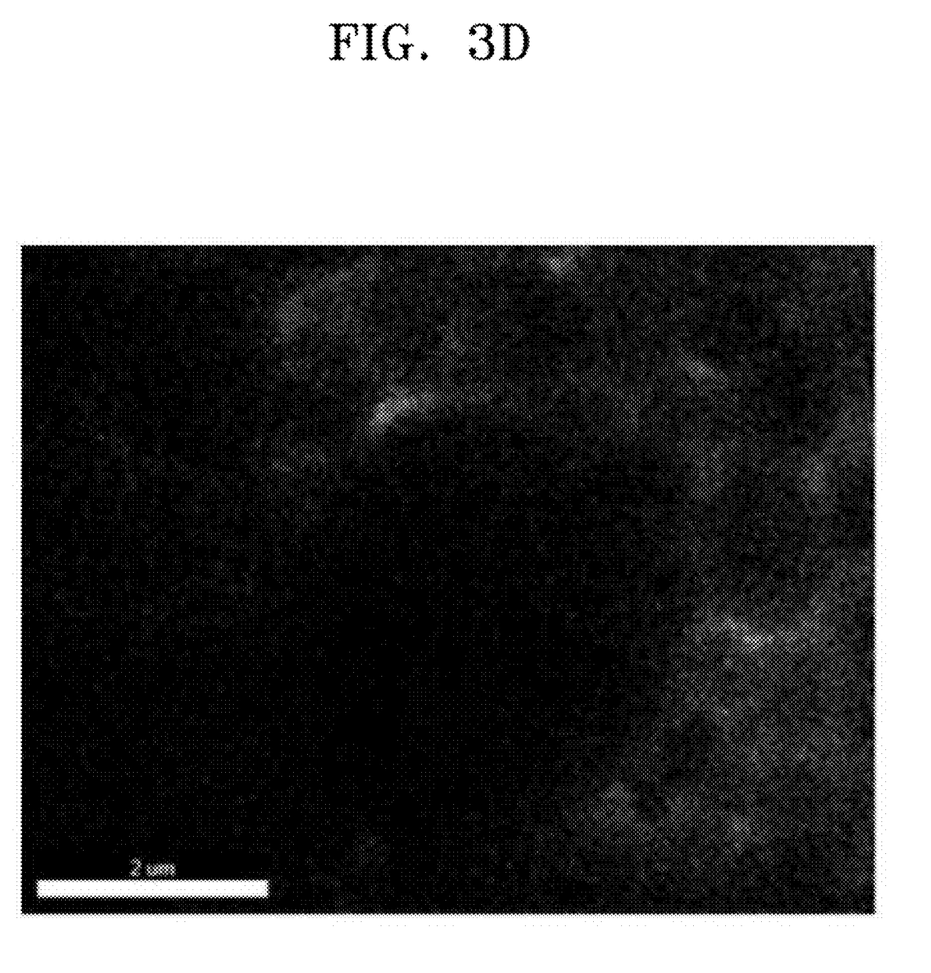
Figure 3E:
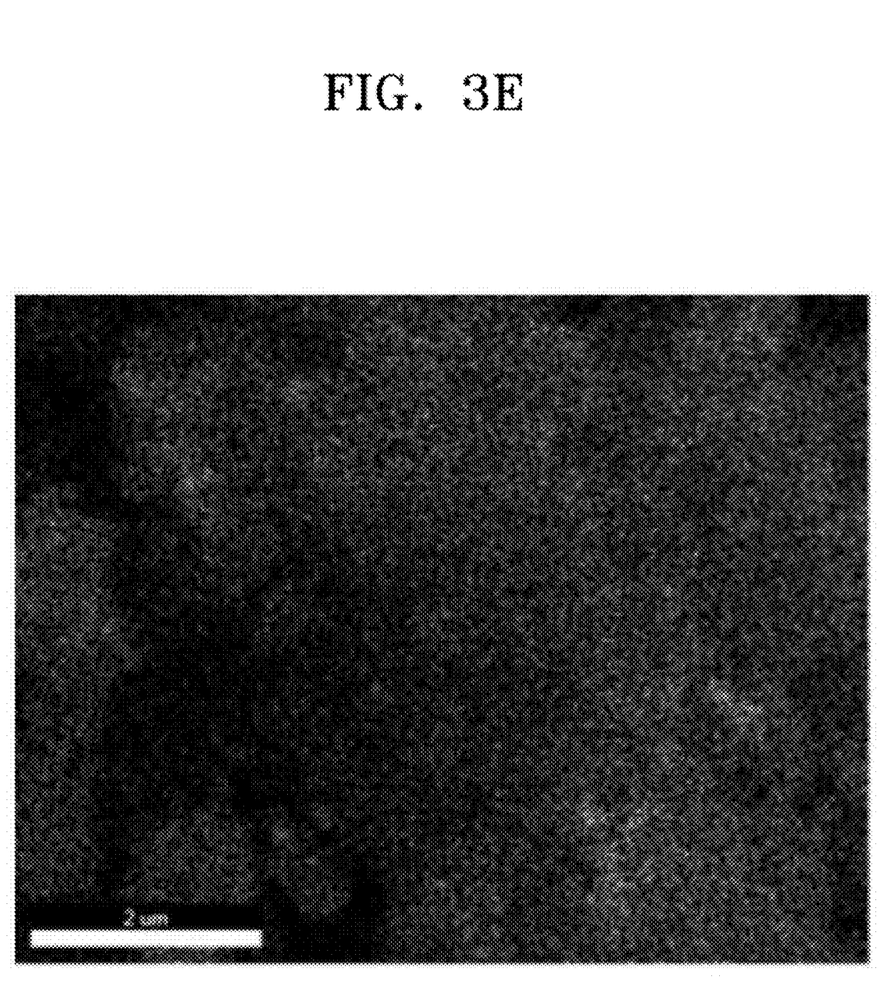

EDX analysis was performed on the negative active material of Example 1. The results thereof are shown in FIGS. 3C to 3E. FIGS. 3C to 3E illustrate EDX analysis results for distribution of titanium, carbon, and oxygen.

Referring to FIGS. 3C to 3E, it was confirmed that titanium, carbon, and oxygen were present on the surface of the negative active material of Example 1 as well as inside the negative active material.

Battery Performance Evaluation

Evaluation Example 1: Evaluation of Charge/Discharge Characteristics

Charge/discharge characteristics of each of the lithium secondary batteries (coin half-cells) manufactured according to Examples 4 to 6 and Comparative Examples 4 to 6, and the lithium secondary batteries (coin full-cells) manufactured according to Examples 7 to 9 and Comparative Example 7, were evaluated using a charger/discharger (manufactured by HNT, 100 mAh level).

1-1: Evaluation of Initial Efficiency

In a $1^{st}$ cycle of charging and discharging at room temperature, each of the lithium secondary batteries (coin half-cells) of Examples 4 to 6 and Comparative Examples 4 to 6 was charged at a constant current of 0.1 C until the voltage reached 10 mV and then charged at a constant voltage of 10 mV until the current reached 0.01 C. The completely charged cells were rested for a period of about 10 minutes, and then each lithium secondary battery was discharged at a constant current of 0.1 C until the voltage reached 1.5 V. In a $2^{nd}$ cycle of charging and discharging, each lithium secondary battery was charged at a constant current of 0.2 C until the voltage reached 10 mV, and then charged at a constant voltage of 10 mV until the current reached 0.01 C. The completely charged cells were rested for a period of about 10 minutes, and then each lithium secondary battery was discharged at a constant current of 0.2 C until the voltage reached 1.5 V. Initial efficiencies obtained therefrom (a value obtained by dividing discharge capacity at $1^{st}$ cycle by charge capacity at $1^{st}$ cycle and multiplying the obtained value by 100) are shown in FIG. 5 and Table 1 below.

TABLE 1

|  | Initial efficiency (%) |
| --- | --- |
| Example 4 | 87.0 |
| Example 5 | 86.3 |
| Example 6 | 85.5 |
| Comparative Example 4 | 84.8 |
| Comparative Example 5 | 85.4 |
| Comparative Example 6 | 84.9 |

Figure 5:
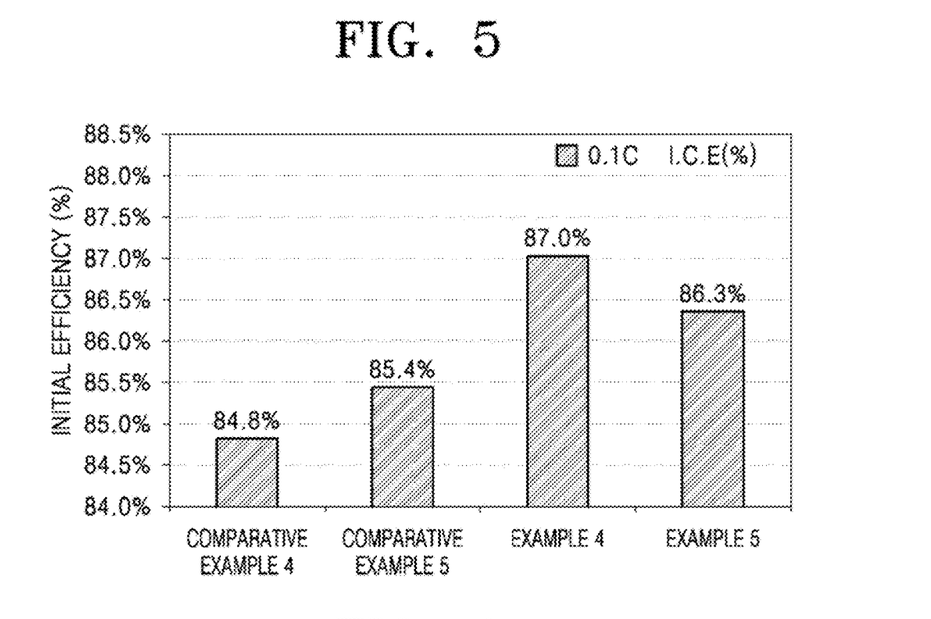
FIG. 5 illustrates a graph showing evaluation results of initial efficiencies of lithium secondary batteries (coin half-cells) manufactured according to Examples 4 and 5 and Comparative Examples 4 and 5.

Referring to FIG. 5 and Table 1, the initial efficiencies of the lithium secondary batteries (coin half-cells) of Examples 4 to 6 were 87.0%, 86.3%, and 85.5%, respectively, while the initial efficiencies of the lithium secondary batteries (coin half-cells) of Comparative Examples 4 to 6 were 84.8%, 85.4%, and 84.9%, respectively. From the results, it was confirmed that the lithium secondary batteries (coin half-cells) of Examples 4 to 6 had higher initial efficiencies than those of the lithium secondary batteries (coin half-cells) of Comparative Examples 4 to 6.

1-2: Evaluation of Lifespan Characteristics

Lifespan characteristics of the lithium secondary batteries (coin full-cells) of Examples 7 to 9 and Comparative Example 7 were evaluated.

To evaluate the lifespan characteristics, each of the lithium secondary batteries (coin full-cells) manufactured according to Examples 7 to 9 and Comparative Example 7 was subjected to formation- and capacity-checking processes at room temperature, charged at 1.0 C until the voltage reached 4.2 V, and then discharged at a constant current of 0.1 C until a cut-off voltage reached 0.01 V. Charge and discharge capacities (charge and discharge capacities at a $1^{st}$ cycle) of each lithium secondary battery were measured.

Figure 6:
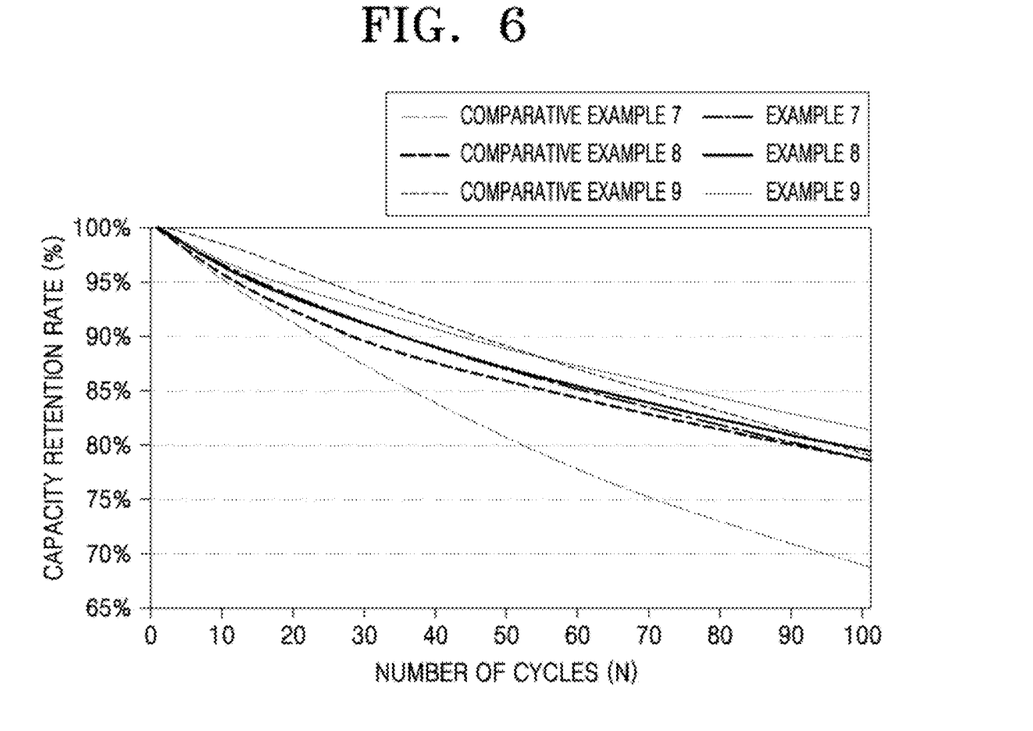
FIG. 6 illustrates a graph showing evaluation results of lifespan characteristics of lithium secondary batteries (coin full-cells) manufactured according to Examples 7 to 9 and Comparative Examples 7 to 9.

Next, each lithium secondary battery was charged at 1.0 C until the voltage reached 4.2 V and then discharged at 1.0 C until the voltage reached 2.5 V. Charge and discharge capacities at this cycle of each lithium secondary battery were measured. Discharge capacities were measured by repetitive charging and discharging until 100 cycles, respectively. The results thereof are shown in FIG. 6 and Table 2 below. The lifespan characteristics were evaluated from a cycle retention rate, and the cycle retention rate (%) was calculated by Equation 1 below:

Cycle retention rate (%)=[(discharge capacity at $100^{th}$ cycle)/(discharge capacity at $1^{st}$ cycle)× 100]  <Equation 1>

TABLE 2

|  | Cycle retention rate (%) |
| --- | --- |
| Example 7 | 78.8 |
| Example 8 | 79.6 |
| Example 9 | 81.6 |
| Comparative Example 7 | 69.0 |

Referring to FIG. 6 and Table 2, it was confirmed that each of the lithium secondary batteries (coin full-cells) of Examples 7 to 9 had a higher cycle retention rate than that of the lithium secondary battery (coin full-cell) of Comparative Example 7.

By way of summation and review, graphite may be used as a negative electrode material of a lithium-ion battery. However, graphite has limited charge/discharge characteristics due to a small interplanar distance, i.e., about 0.335 nm, deficiency in intercalation sites of lithium ions on basal planes thereof, and a long diffusion region of graphite interlayers.

In addition, silicon-based negative active materials may exhibit high capacity but may undergo volumetric expansion as charging and discharging proceed, resulting in reduced capacity.

Therefore, there is a need for a negative active material having enhanced charge/discharge characteristics, a negative electrode including the same, a lithium secondary battery including the negative electrode, and a method of preparing the negative active material.

As described above, embodiments may provide a negative active material having enhanced initial efficiency and lifespan characteristics.

A negative active material according to an embodiment includes a silicon alloy core and a shell including a metal oxide on the silicon alloy core, in which an amount of the metal oxide is from greater than 0 wt % to less than about 12 wt % based on a total weight of the negative active material. Thus, a lithium secondary battery including the negative active material may have enhanced charge/discharge characteristics such as initial efficiency and lifespan characteristics.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A negative active material, comprising:
a plurality of particles each including a silicon alloy core and a shell formed on the silicon alloy core, wherein;
the silicon alloy core is formed using a mixture that consists of silicon, iron, manganese, and carbon; and
the shell is formed on the silicon alloy core, the shell including an oxide of one or more of titanium, zirconium, aluminum, cobalt, or lithium,
each silicon alloy core has pores therein, and
wherein an amount of the metal oxide is from greater than 0 wt % to less than 12 wt % based on a total weight of the negative active material.

2. The negative active material as claimed in claim 1, wherein the amount of the metal oxide is from greater than 0 wt % to 6 wt % based on the total weight of the negative active material.

3. The negative active material as claimed in claim 1, wherein the metal oxide includes at least one of $TiO_2$, $ZrO_2$, $Al_2O_3$, $Co_3O_4$, $Li_2ZrO_3$, or $LiTi_2O_4$.

4. The negative active material as claimed in claim 1, wherein the metal oxide is $TiO_2$.

5. The negative active material as claimed in claim 1, wherein the metal oxide has a median particle diameter D50 of 5 nm to 5 μm.

6. The negative active material as claimed in claim 1, wherein the negative active material has a structure in which the metal oxide in a particulate form forms a shell that entirely covers a surface of the silicon alloy core.

7. The negative active material as claimed in claim 1, wherein the metal oxide included in the shell is partially dispersed in the pores.

8. The negative active material as claimed in claim 1, wherein the silicon alloy core consists of silicon, iron, manganese, and carbon, and is represented by Formula 1 below:

$$Si_xFe_yMn_zC_w \qquad \text{<Formula 1>}$$

wherein, in Formula 1, x, y, z, and w refer to atomic percentages (at %);

$0<x\leq90$, $0<y\leq20$, $0<z\leq5$, $0<w\leq30$, and $x+y+z+w=100$, provided that the weight of carbon in the core is 1 wt % to 5 wt % based on the total weight of the negative active material.

9. The negative active material as claimed in claim 1, wherein the metal oxide includes at least one of $ZrO_2$, $Al_2O_3$, $Co_3O_4$, $Li_2ZrO_3$, or $LiTi_2O_4$.

10. A negative electrode comprising the negative active material as claimed in claim 1.

11. A lithium secondary battery, comprising:
the negative electrode as claimed in claim 10;
a positive electrode; and
an electrolyte between the negative electrode and the positive electrode.

12. A method of preparing a negative active material, the method comprising: preparing a silicon alloy core consisting of silicon, iron, manganese, and carbon; and preparing the negative active material as claimed in claim 1 by mixing the silicon alloy core and a metal oxide by mechanical milling.

13. The method as claimed in claim 12, wherein the mechanical milling includes one or more of planetary ball milling, vibratory ball milling, or attrition milling.

* * * * *